US012154540B2

(12) United States Patent
Cho

(10) Patent No.: US 12,154,540 B2
(45) Date of Patent: Nov. 26, 2024

(54) APPARATUS AND METHOD FOR CANCELLING NOISE IN VEHICLE

(71) Applicants: Hyundai Motor Company, Seoul (KR); Kia Corporation, Seoul (KR)

(72) Inventor: Yong Sik Cho, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 188 days.

(21) Appl. No.: 17/929,112

(22) Filed: Sep. 1, 2022

(65) Prior Publication Data

US 2023/0085229 A1 Mar. 16, 2023

(30) Foreign Application Priority Data

Sep. 13, 2021 (KR) ........................ 10-2021-0121956

(51) Int. Cl.
*G10K 11/16* (2006.01)
*G10K 11/178* (2006.01)
*H04B 1/00* (2006.01)

(52) U.S. Cl.
CPC .. *G10K 11/17881* (2018.01); *G10K 11/17883* (2018.01)

(58) Field of Classification Search
CPC .................... G10K 11/17881; G10K 11/17883
USPC .................................................. 381/71.1, 86
See application file for complete search history.

(56) References Cited

U.S. PATENT DOCUMENTS

2017/0061953 A1* 3/2017 An ........................ G10K 11/34

FOREIGN PATENT DOCUMENTS

KR 20170053058 A * 5/2017 ......... G01C 21/3629

* cited by examiner

*Primary Examiner* — Ammar T Hamid
(74) *Attorney, Agent, or Firm* — Slater Matsil, LLP

(57) ABSTRACT

In accordance with an embodiment, a method for canceling noise in a vehicle includes receiving noise information from an earphone worn by a user inside the vehicle; generating a compensating signal based on the noise information; and outputting the compensating signal through the earphone and an internal speaker of the vehicle.

20 Claims, 11 Drawing Sheets

APPARATUS AND METHOD FOR CANCELLING NOISE IN VEHICLE

CROSS-REFERENCE TO RELATED APPLICATIONS

This application claims the benefit of priority to Korean Patent Application No. 10-2021-0121956, filed in the Korean Intellectual Property Office on Sep. 13, 2021, the entire contents of which are incorporated herein by reference.

TECHNICAL FIELD

The present disclosure relates to an apparatus and a method for canceling noise in a vehicle.

BACKGROUND

The interior of a vehicle is remarkably weak from noise due to noise of a vehicle body or wind noise caused by driving.

Although the noise canceling function of an earphone is widely known, the limitations of the function are clearly present. In particular, when a user listens to a multimedia sound using an infotainment device inside the vehicle, the user cannot listen to the sound, even though the internal noise of the vehicle is effectively canceled through an existing noise canceling function.

SUMMARY

An aspect of the present disclosure provides an apparatus and a method for canceling noise in a vehicle, capable of effectively canceling internal nose of the vehicle.

In addition, another aspect of the present disclosure provides an apparatus and a method for canceling noise in a vehicle, capable of more effectively canceling noise actually felt by an occupant.

In addition, another aspect of the present disclosure provides an apparatus and a method for canceling noise in a vehicle, enabling a user to listen to a multimedia sound nearer to an original sound inside a vehicle.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a method for canceling noise in a vehicle may include receiving noise information from an earphone worn by a user being inside the vehicle, generating a compensating signal based on the noise information, and outputting the compensating signal through the earphone and an internal speaker of the vehicle.

According to an embodiment of the present disclosure, the receiving of the noise information may include receiving external noise information acquired through a first microphone, which is positioned outwardly from a user, of the earphone, and receiving internal noise information acquired through a second microphone positioned at an area, which makes contact with the user, of the earphone.

According to an embodiment of the present disclosure, the generating of the compensating signal may include correcting the compensating signal, when amplitude information included in the internal noise information is equal to or greater than a preset threshold value.

According to an embodiment of the present disclosure, the correcting of the compensating signal may include generating a first offset compensating signal based on the internal noise information and synthesizing the first offset compensating signal with the compensating signal.

According to an embodiment of the present disclosure, the generating of the compensating signal may include generating a sound signal by synthesizing a multimedia sound with the compensating signal.

According to an embodiment of the present disclosure, the receiving of the noise information may further include receiving the sound signal included in the internal noise information.

According to an embodiment of the present disclosure, the generating of the compensating signal may further include generating a subtraction signal by subtracting the sound signal, which is included in the internal noise information, from the multimedia sound which is preset, and correcting the compensating signal, when the strength of the subtraction signal is equal to or less than a preset threshold value.

According to an embodiment of the present disclosure, the correcting of the compensating signal may include generating a second offset compensating signal corresponding to the subtraction signal and synthesizing the second offset compensating signal with the compensating signal.

According to an embodiment of the present disclosure, the providing of the noise information may include receiving first noise information from a first earphone and receiving second noise information from a second earphone. The generating of the compensating signal may include generating a first compensating signal based on the first noise information and generating a second compensating signal based on the second noise information.

According to an embodiment of the present disclosure, the outputting of the compensating signal may include outputting the first compensating signal through a first speaker group corresponding to a first earphone, and outputting the second compensating signal through a second speaker group corresponding to a second earphone.

According to another aspect of the present disclosure, an apparatus for canceling noise inside a vehicle may include a speaker disposed inside the vehicle and a control module to make short-range communication with an earphone worn by a user being inside the vehicle, to generate a compensating signal based on noise information received from the earphone, and to output the compensating signal through the earphone and a speaker inside the vehicle through the communication module.

According to an embodiment of the present disclosure, the control module may receive external noise information acquired through a first microphone, which is positioned outwardly from a user, of the earphone, and receive internal noise information acquired through a second microphone positioned at an area, which makes contact with the user, of the earphone.

According to an embodiment of the present disclosure, the control module may correct the compensating signal, when amplitude information included in the internal noise information is equal to or greater than a preset threshold value.

According to an embodiment of the present disclosure, the control module may correct the compensating signal by generating an offset compensating signal based on the internal noise information and synthesizing the offset compensating signal with the compensating signal.

According to an embodiment of the present disclosure, the control module may generate a sound signal by synthesizing a multimedia sound with the compensating signal.

According to an embodiment of the present disclosure, the control module may acquire the sound signal from the internal noise information.

According to an embodiment of the present disclosure, the control module may generate a subtraction signal by subtracting the sound signal, which is included in the internal noise information, from the multimedia sound which is preset, and may correct the compensating signal, when the strength of the subtraction signal is equal to or less than a preset threshold value.

According to an embodiment of the present disclosure, the control module may correct the compensating signal by generating a second offset compensating signal corresponding to the subtraction signal and synthesizing the second offset compensating signal with the compensating signal.

According to an embodiment of the present disclosure, the control module may generate a first compensating signal corresponding to first noise information acquired through the first earphone and a second compensating signal corresponding to second noise information acquired through the second earphone.

According to an embodiment of the present disclosure, the control module may select a first speaker group, which corresponds to the first earphone, of a plurality of speaker groups and select a second speaker group, which corresponds to a second earphone, of the plurality of speaker groups.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
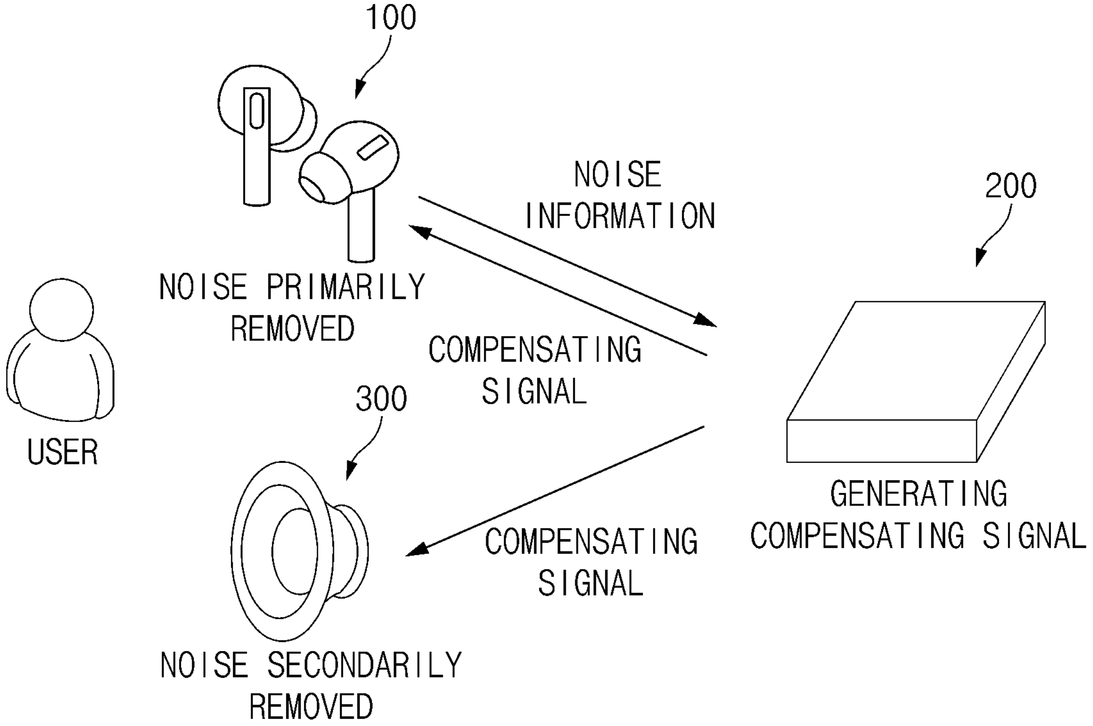
FIG. 1 is a view schematically illustrating an apparatus for canceling noise inside a vehicle, according to an embodiment of the present disclosure.

Hereinafter, some embodiments of the present disclosure will be described in detail with reference to the accompanying drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In addition, in the following description of components according to an embodiment of the present disclosure, the terms 'first', 'second', 'A', 'B', '(a)', and '(b)' may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined in the present application.

Hereinafter, embodiments of the present disclosure will be described with reference to FIGS. 1 to 11.

Figure 2:
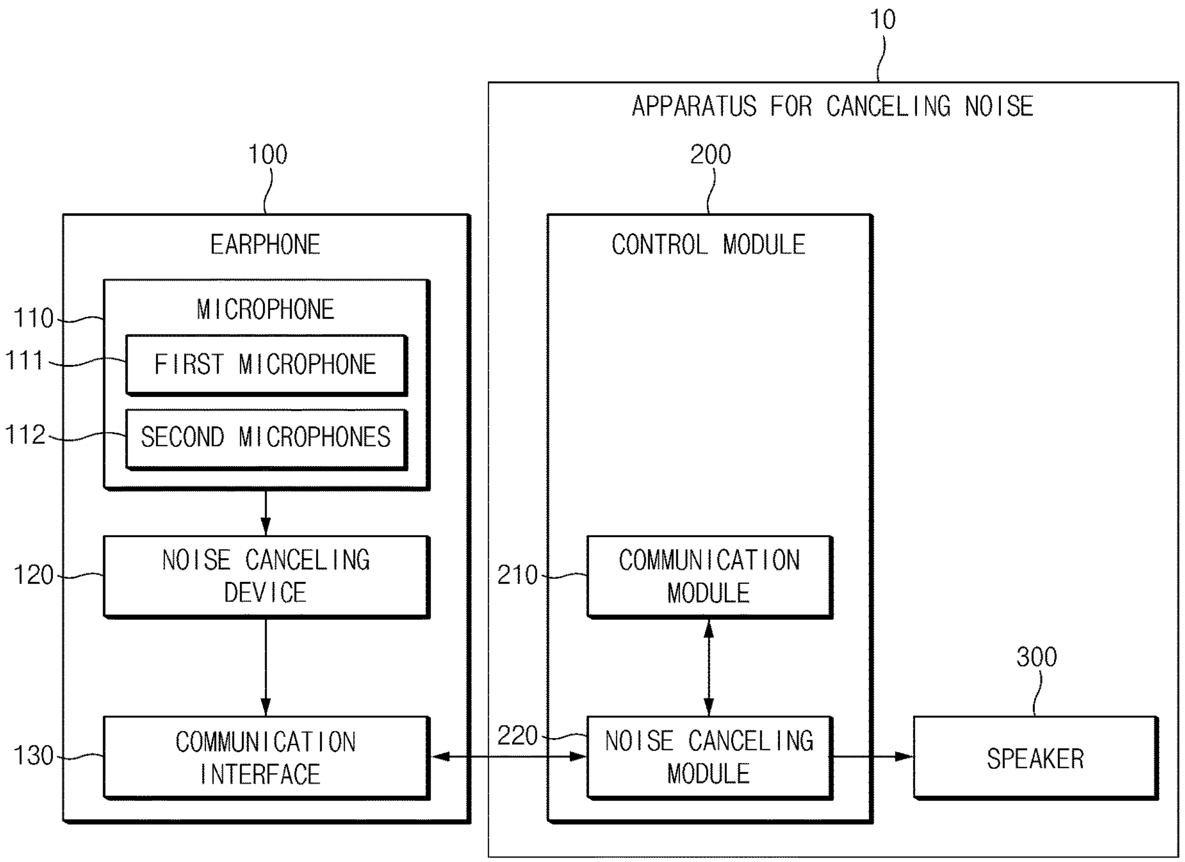
FIG. 2 is a view illustrating the components of an apparatus for canceling noise inside a vehicle, according to an embodiment of the present disclosure.

FIG. 1 is a view schematically illustrating an apparatus for canceling noise inside a vehicle, according to an embodiment of the present disclosure, and FIG. 2 is a view illustrating the components of the apparatus for canceling the noise inside the vehicle, according to an embodiment of the present disclosure.

Referring to FIGS. 1 and 2, according to an embodiment of the present disclosure, an apparatus 10 for canceling noise inside the vehicle may be installed inside the vehicle and may include a control module 200 and a speaker 300. The apparatus 10 for canceling noise inside the vehicle may internetwork with an earphone 100 to perform a noise canceling operation. Accordingly, the apparatus 10 for canceling the noise may cancel the internal noise of the vehicle.

The earphone 100 may include first and second microphones 111 and 112, a noise canceling module 220, and a communication interface 130. The first microphone 111 is positioned outwardly from a user to acquire an external voice. The second microphone 112 may be positioned at an area, which makes contact with the user, of the earphone 100 to acquire internal noise. For example, the second microphone 112 may be positioned at an area making contact with an ear canal of a user or an earflap of the user. Accordingly, the second microphone 112 may acquire a voice signal to which the user directly listens. The voice signal acquired from the second microphone 112 may be regarded as the internal noise, under a situation other than a situation in which an intended voice signal is transmitted from the earphone 100.

The noise canceling device 120 may generate a compensating signal, based on first noise information acquired from the first microphone 111. The compensating signal may be a signal for canceling the first noise. Because the compensating signal provided from the control module 200 to be described below may be used as the compensating signal, the noise canceling device 120 may not generate the compensating signal.

The communication interface 130 may transmit the first noise information and second noise information to the control module 200, and may receive the compensating signal from the control module 200.

The control module 200 may receive noise information from the earphone 100 and may generate the compensating signal based on the noise information. To this end, the control module 200 may include a communication module 210, and the noise canceling module 220.

The communication module 210 may receive noise information from the earphone 100, and may transmit the compensating signal to the earphone 100 and the speaker 300. The noise information may include information on a frequency, an amplitude, and a period of a noise signal. The noise signal may include the external noise information, which is acquired through the first microphone in of the earphone 100, and the internal noise information, which is acquired through the second microphone 112. The communication module 210 may transmit or receive data through a communication standard such as a wireless HD (WiHD), a wireless home digital interface (WHDI), or a wireless fidelity (WiFi). Alternatively, the data may be, by wireless, transmitted or received through a short-range wireless communication, such as Bluetooth, ZigBee, or a binary code division multiple access (CDMA).

The noise canceling module 220 may generate the compensating signal based on the noise information. In addition, the noise canceling module 220 may perform a quality evaluation in a state in which noise is canceled based on the compensating signal. The noise canceling module 220 may modulate the compensating signal, when a noise canceling extent does not reach a target level.

The noise canceling module 220 may receive a multimedia sound from an infotainment device internet working with the control module 200, and may synthesize the compensating signal with the multimedia sound to generate a sound signal.

The speaker 300 may transmit the compensating signal under the control of the control module 200.

Figure 3:
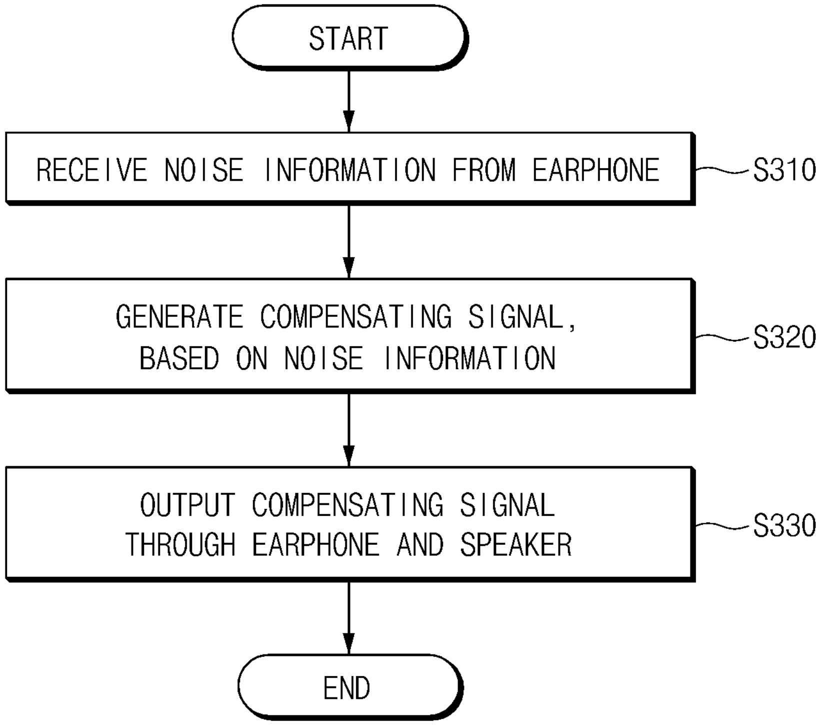
FIG. 3 is a flowchart illustrating a method for canceling noise inside a vehicle, according to an embodiment of the present disclosure.

FIG. 3 is a flowchart illustrating a method for canceling noise inside a vehicle, according to an embodiment of the present disclosure.

Referring to FIG. 3, according to an embodiment of the present disclosure, in the method for canceling noise inside the vehicle, the control module 200 may receive the noise information from the earphone 100 in a first step (S310). The control module 200 may receive the external noise information acquired from the first microphone 111 of the earphone 100 and the internal noise information acquired from the second microphone 112 of the earphone 100.

In a second step (S320), the control module 200 may generate the compensating signal, based on the noise information.

Figure 4:
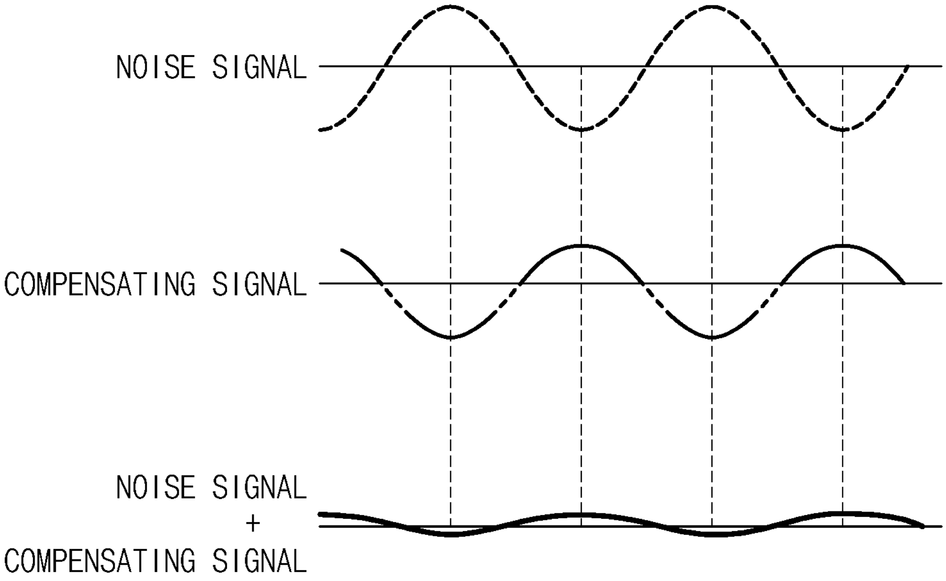
FIG. 4 is a schematic view illustrating a method for generating a compensating signal.
Figure 5:
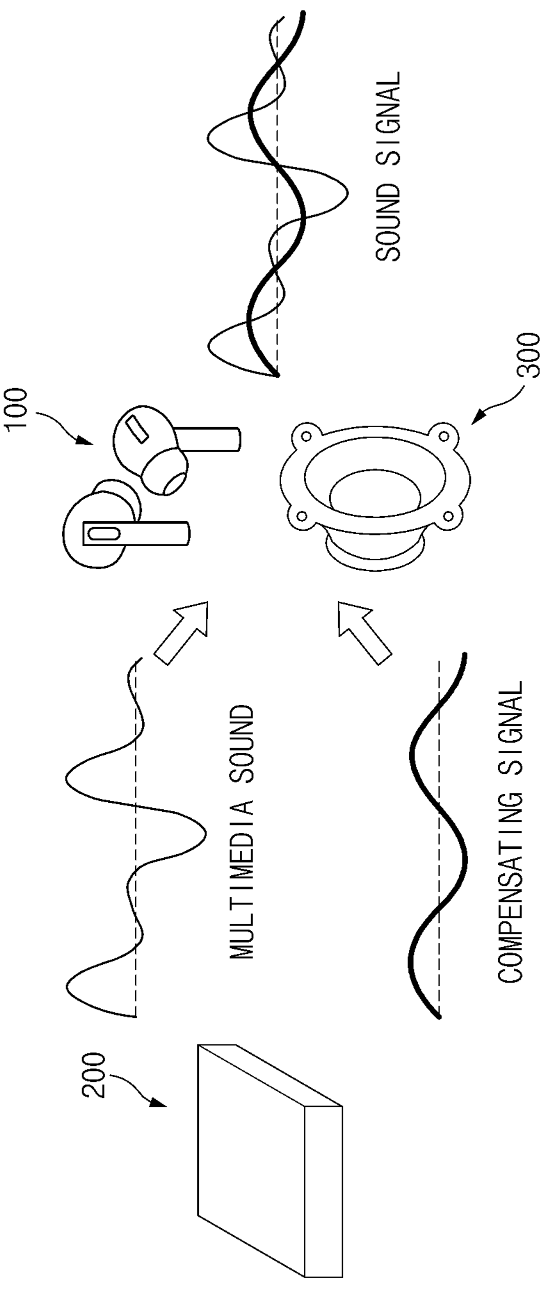
FIG. 5 is a schematic view illustrating a method for generating a sound signal.

FIG. 4 is a schematic view illustrating a method for generating the compensating signal, and FIG. 5 is a schematic view illustrating a method for generating a sound signal.

Referring to FIG. 4, the control module 200 may generate the compensating signal, based on the noise signal included in the noise information. The compensating signal may be a signal the same as the noise signal in frequency, period, and amplitude, and reverse to the noise signal in phase. The compensating signal may make a destructive interference with the noise signal.

In addition, the control module 200 may generate the sound signal by synthesizing the compensating signal with the multimedia sound, as illustrated in FIG. 5.

In a third step (S330), the control module 200 may output the generated compensating signal through the earphone 100 and the speaker 300 inside the vehicle.

The user may listen to the compensating signal through the earphone 100 and the speaker 300. Accordingly, the user may obtain an effect of primarily canceling noise, based on the compensating signal heard from the earphone 100, and may obtain an effect of secondarily canceling noise based on the compensating signal heard from the speaker 300. The noise is canceled, based on the compensating signal transmitted from the speaker 300 to a body of the user, as well as the compensating signal from the earphone 100 in close contact with the ear of the user. Accordingly, the user may feel that calmness is more effectively made inside the vehicle.

Figure 6:
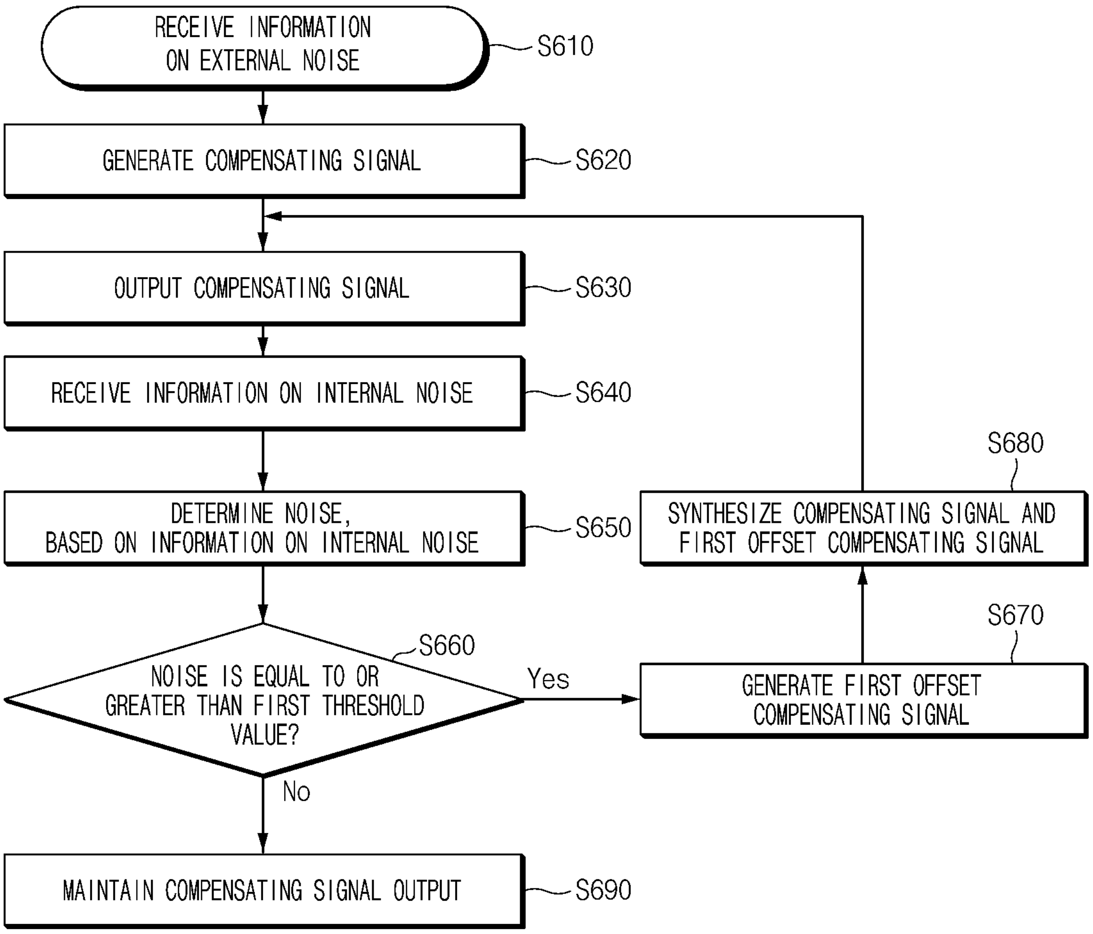
FIG. 6 is a flowchart illustrating a method for canceling noise inside a vehicle, according to another embodiment of the present disclosure.

FIG. 6 is a flowchart illustrating a method for canceling noise inside a vehicle, according to another embodiment of the present disclosure. FIG. 6 illustrates a method for determining the reliability for the compensating signal generated according to the embodiment illustrated in FIG. 3 and for adjusting the compensating signal, based on the reliability. In particular, FIG. 6 illustrates that noise is canceled by reflecting the intent of the user desiring the calmness inside the vehicle, without listening to the multimedia sound.

Referring to FIG. 6, according to another embodiment of the present disclosure, in the method for canceling noise inside the vehicle, the control module 200 may receive the external noise information acquired from the first microphone 111 of the earphone 100 in a first step (S610). Since the first microphone 111 is positioned at an area not in contact with the body of the user, the external noise may be regarded as internal noise of the vehicle, before the user aurally recognizes the external noise.

In a second step (S620), the control module 200 may generate the compensating signal based on the external noise information.

In other words, the control module 200 may generate the compensating signal based on the internal noise of the vehicle. The control module 200 may generate the compensating signal, based on the external noise information received in real time.

In a third step (S630), the control module 200 may output the generated compensating signal through the earphone 100 and the speaker 300 inside the vehicle.

The user may obtain a more improved canceling effect, as the earphone 100 and the speaker 300 are controlled together.

In a fourth step (S640), the control module 200 may receive the internal noise information.

Since the internal noise information is acquired from the second microphone 112 positioned at an area making contact with a body (especially, an ear) of the user, the internal noise information may correspond to a voice at the moment when the user perceives the hearing sense. In particular, in the fourth step (S640), since the user perceives the voice, from which noise is canceled through the earphone 100 and the speaker 300, the internal noise may be regarded as the voice signal from which the noise is canceled based on the compensating signal.

In a fifth step (S650), the control module 200 may determine noise, based on the internal noise information.

In situations where the intended voice is not transmitted to the earphone 100 or the speaker 300 inside the vehicle, the strength of the voice signal included in the internal noise information may be weakened as the noise canceling operation is performed well. Accordingly, the control module 200 may determine the reliability of the noise cancelation based on the strength of the voice signal included in the internal noise information.

Accordingly, in the sixth step (S660) and the seventh step (S670), the control module 200 may generate a first offset compensating signal, when the noise signal included the internal noise information is equal to or greater than a first threshold value.

The first threshold value is used to determine the strength of the voice signal included in the internal noise information, and may be an amplitude of a preset size. The control module 200 may generate, as the first offset compensating signal, a signal the same as the voice signal included in the internal noise information in frequency, period, or amplitude, or reverse to the voice signal in phase.

In a second step (S680), the control module 200 may synthesize the compensating signal with the first offset compensating signal.

The control module 200 may synthesize the compensating signal, which is generated in the second step (S620), with the first offset compensating signal.

When the noise is less than the first threshold value, the control module 200 may maintain the compensating signal output, in a ninth step (S690). In other words, the control module 200 may output a compensating signal, which is generated based on the external noise information acquired in real time, through the earphone 100 and the speaker 300.

Figure 7:
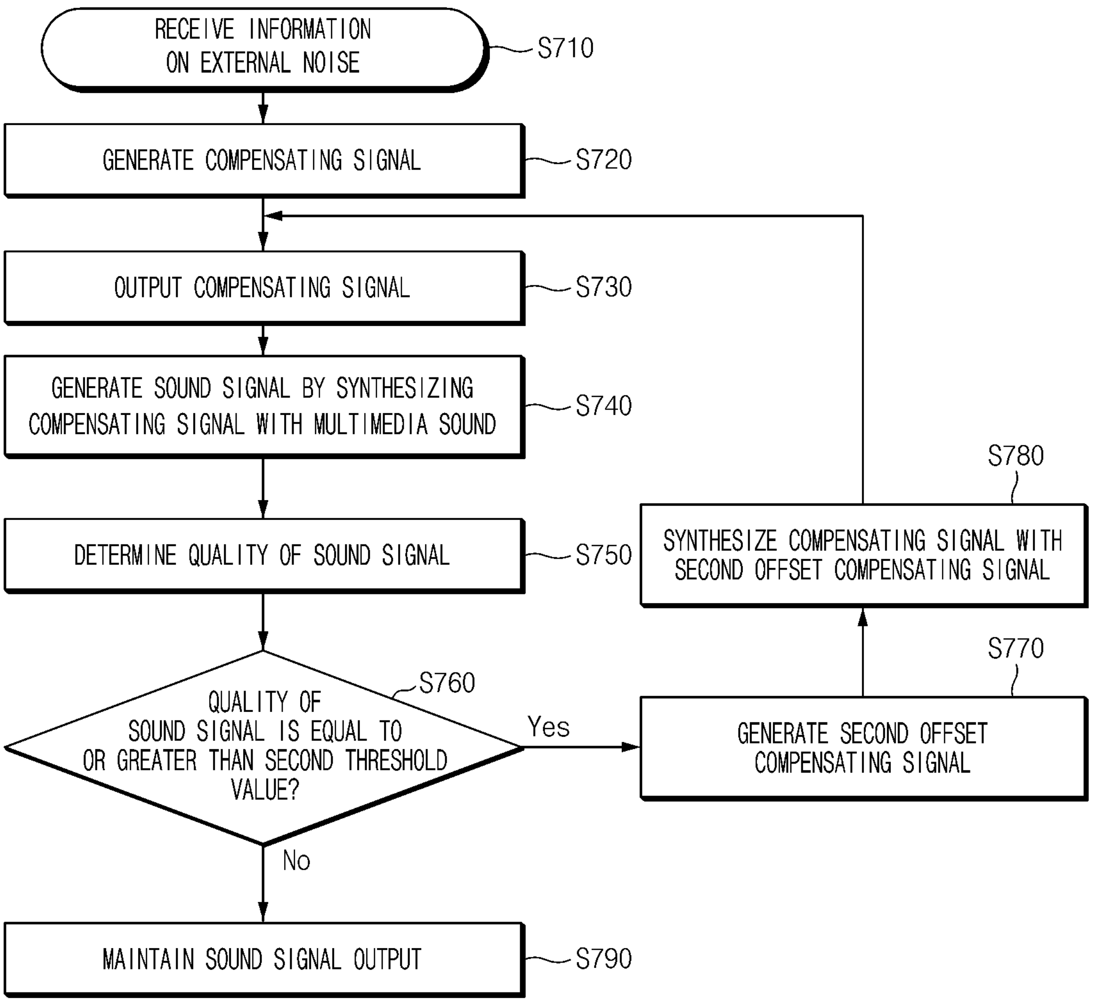
FIG. 7 is a flowchart illustrating a method for canceling noise inside a vehicle, according to another embodiment of the present disclosure.

FIG. 7 is a flowchart illustrating a method for canceling noise inside a vehicle, according to another embodiment of the present disclosure.

In a first step S710, the control module 200 may receive external noise information acquired from the first microphone 111 of the earphone 100. In addition, in a second step (S720), the control module 200 may generate the compensating signal, based on the external noise information. Subsequently, in a third step (S730), the control module 200 may output the generated compensating signal through the earphone 100 and the speaker 300. The first step S710, the second step S720, and the third step S730 may be the same as the first step S610, the second step S620, and the third step S630 described above with reference to FIG. 6.

In a fourth step (S740), the control module 200 may generate the sound signal. The control module 200 may generate the sound signal by synthesizing the compensating signal with the multimedia source, as illustrated in FIG. 5.

In a fifth step (S750), the control module 200 may determine the quality of a sound signal.

The control module 200 may compare the internal noise information, which is acquired from the second microphone 112, with the multimedia sound, to determine the quality of the sound signal. When the earphone 100 transmits the sound signal, ideally, the internal noise information acquired through the second microphone 112 is a sound signal from which noise is canceled. The control module 200 may generate a subtraction signal obtained by subtracting the sound signal in the internal noise information from the multimedia source which is preset, and may determine the quality of the sound signal based on the strength of the subtraction signal.

In the sixth step (S760) and the seventh step (S770), the control module 200 may generate an offset compensating signal, when the strength of the subtraction signal is equal to or greater than the second threshold value which is preset. The control module 200 may generate, as a second offset compensating signal, a signal the same as the subtraction signal in frequency, period, or amplitude, and reverse in phase with respect to the subtraction signal.

In an eighth step (S780), the control module 200 may synthesize the compensating signal with the second offset compensating signal. The control module 200 may synthesize the compensating signal, which is generated in the second step (S720), with the second offset compensating signal.

When the noise is less than a second threshold value, the control module 200 may maintain the compensating signal output, in a ninth step (S790). In other words, the control module 200 may output the compensating signal, which is generated based on the external noise information acquired in real time, through the earphone 100 and the speaker 300.

According to an embodiment as illustrated in FIG. 7, the user may listen to the multimedia sound closer to an original sound inside the vehicle.

Figure 8:
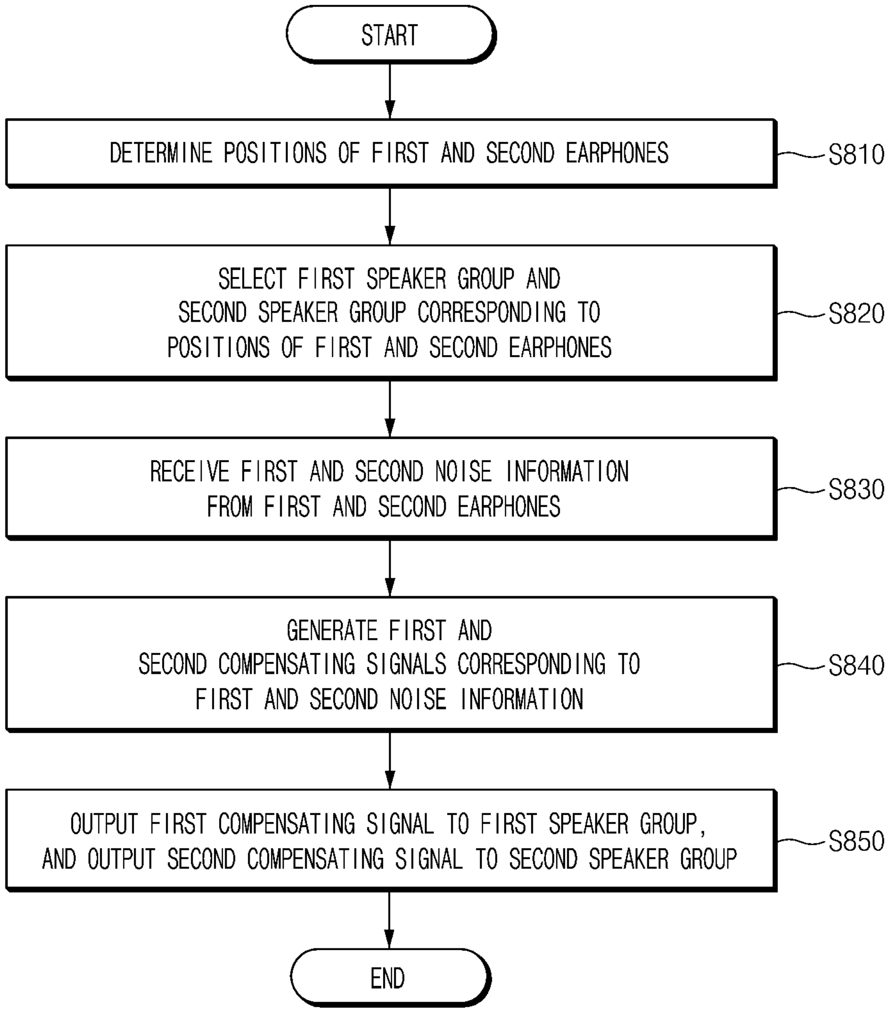
FIG. 8 is a flowchart illustrating a method for providing a compensating signal to a plurality of earphones by distributing speakers.
Figure 9:
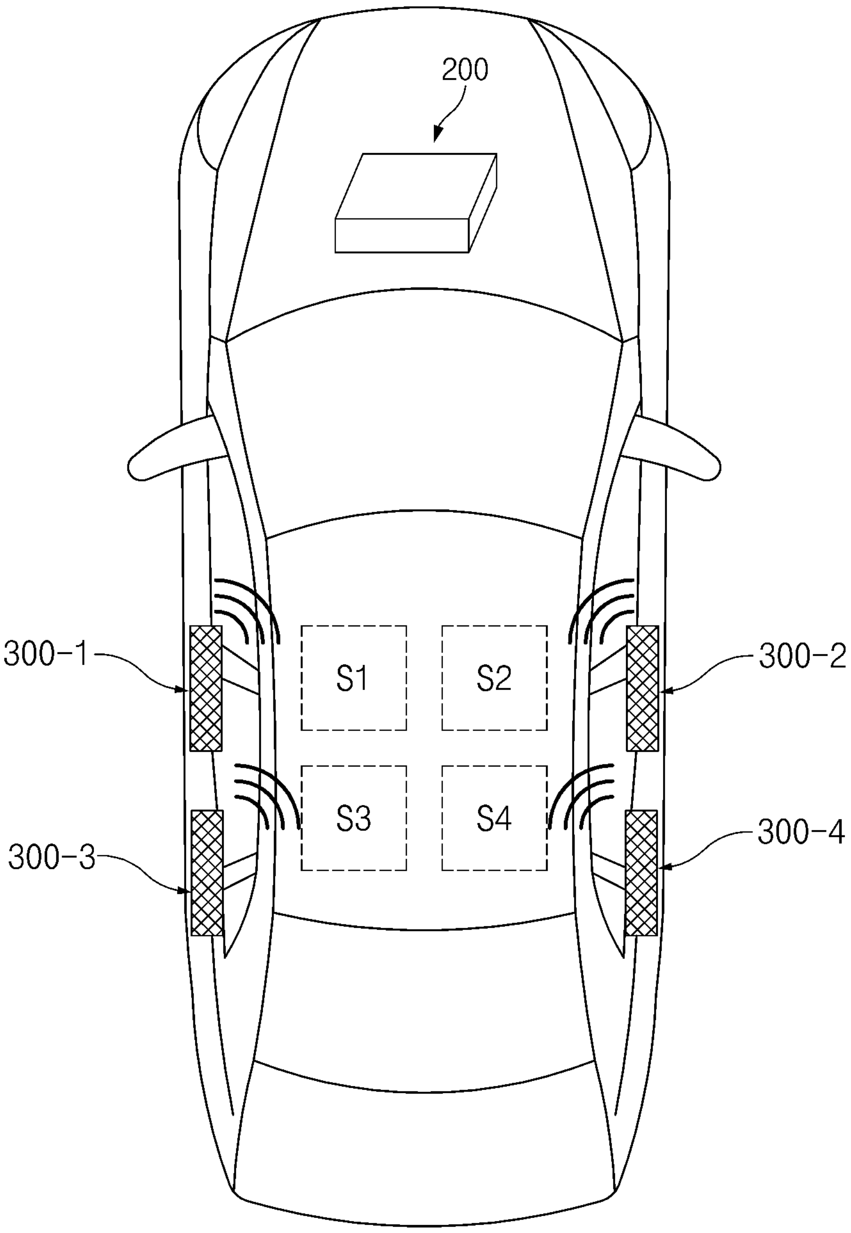
FIG. 9 is a view illustrating a method for distributing speakers.

FIG. 8 is a flowchart illustrating a method for transmitting a compensating signal to a plurality of earphones by distributing speakers. FIG. 9 is a view illustrating a method for distributing speakers. FIGS. 8 and 9 illustrates that compensating signals are provided to two earphones according to an embodiment.

Referring to FIGS. 8 and 9, the control module 200 may identify the positions of the first earphone and the second earphone in the first step (S810) to distribute the speakers.

The positions of the first earphone and the second earphone may refer to positions of seats taken by users. For example, when the user having the first earphone takes a first seat 's1', the position of the first earphone may be referred to as the position of the first seat 's1'.

In the second step (S820), the control module 200 may select a first speaker group corresponding to the position of the first earphone, and may select a second speaker group corresponding to the position of the second earphone.

The control module 200 may match speakers, which are closer to the first earphone, to the first earphone, and match speakers, which are closer to a second earphone, to the second earphone. For example, when the position of the first earphone is a position of the first seat 's1' and the position of the second earphone is a position of a second seat 's2', the control module 200 may match the first speaker 300-1 and the third speaker 300-3 to the first earphone, and may match the second speaker 300-2 and the fourth speaker 300-4 to the second earphone.

The speakers matched depending on the positions of the earphones may be stored in the form of a look-up table. The control module 200 may search the look-up table, when the position of the earphone is identified.

In a third step (S830), the control module 200 may receive the first noise information from the first earphone, and may receive the second noise information from the second earphone.

In a fourth step (S840), the control module 200 may generate a first compensating signal based on the first noise information and may generate a second compensating signal based on the second noise information.

In a fifth step (S850), the control module 200 may output the first compensating signal through the first speaker group and a second compensating signal through the second speaker group.

According to an embodiment illustrated in FIG. 8, the procedure of generating the first compensating signal based on the first noise information may include embodiments illustrated in FIGS. 3, 6, and 7. Similarly, the procedure of generating the second compensating signal based on the second noise information may include embodiments illustrated in FIGS. 3, 6, and 7.

Figure 10:
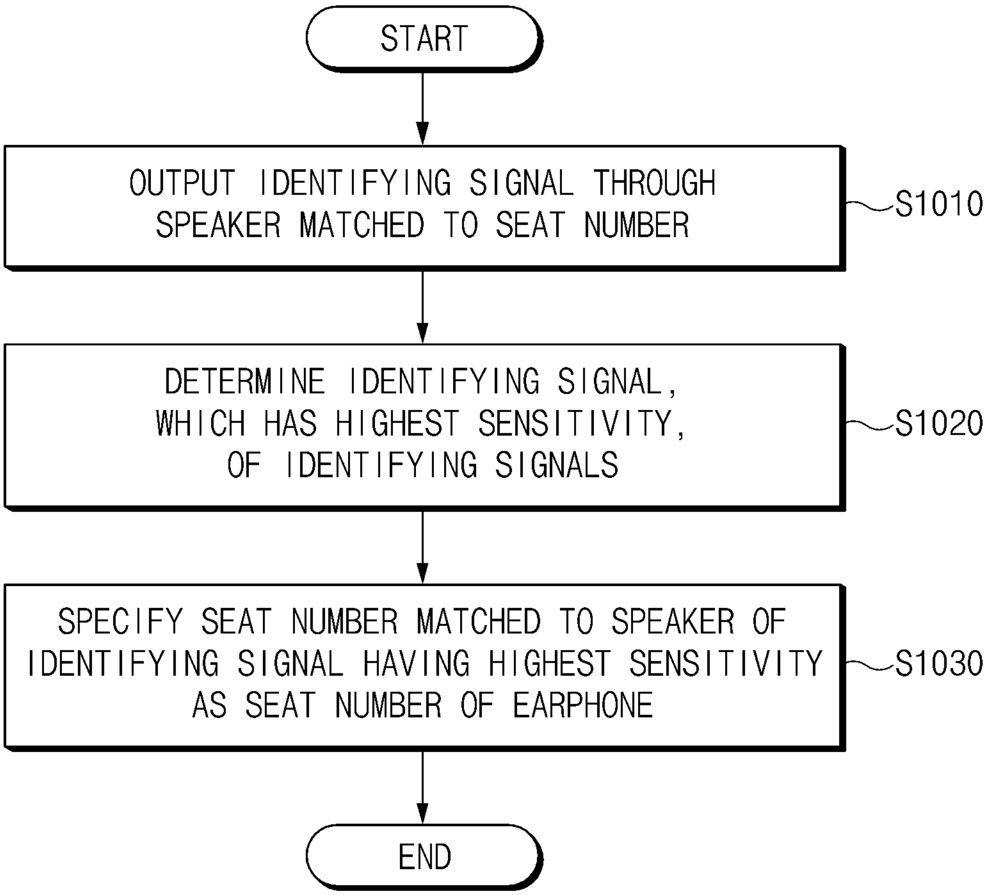
FIG. 10 is a flowchart illustrating a method for identifying the position of an earphone.

FIG. 10 is a flowchart illustrating a method for identifying the position of the earphone, according to an embodiment illustrated in FIG. 8.

The following description will be described with reference to FIG. 10, regarding a method for identifying the position of the first earphone of a plurality of earphones. According to an embodiment of the present disclosure, the number of the seat, in which the first earphone is positioned, may be acquired, and the position of the first earphone may be determined.

To this end, in a first step (S1010), the speakers 300-1, 300-2, 300-3, and 300-4 may output mutually different identifying signals, respectively, under the control of the control module 200. Although the present specification employs an embodiment in which the identifying signal is output through the speakers 300-1, 300-2, 300-3, and 300-4, another component may be employed to output the identifying signal.

The speakers 300-1, 300-2, 300-3, and 300-4 are one-to-one matched to seats inside the vehicle. The speakers 300-1, 300-2, 300-3, and 300-4 may be matched to seats closest to the speakers 300-1, 300-2, 300-3, and 300-4. For example, the first speaker 300-1 may be matched to a left seat in a front row. The seats are assigned with unique seat numbers to distinguish between the positions of the seats. Accordingly, each of the speakers 300-1, 300-2, 300-3, and 300-4 may be matched to one seat number. The seat number matched with each of the speakers 300-1, 300-2, 300-3, and 300-4 may be previously stored in a database of the control module 200.

Each of the speakers 300-1, 300-2, 300-3, and 300-4 may employ a directional speaker to transmit a sound to the matched seat. For example, the first speaker 300 may correspond to the first speaker 300 to transmit a sound toward a front-left seat (see, the first seat 's1') among four seats inside the vehicle. Identifying signals output by the speakers 300-1, 300-2, 300-3, and 300-4 may be different from each other in at least one of frequency, amplitude, period, or output timing.

In the second step (S1020), the control module 200 may receive information on an identifying signal having the highest sensitivity, from the first earphone.

The identifying signal having the highest sensitivity is referred to as an identifying signal, which is received with the highest sensitivity, of identifying signals received by the first earphone. The first earphone may detect a receive sensitivity of each of signals received from the first to fourth speakers 300-1, 300-2, 300-3, and 300-4, and may extract the identifying signal, which represents the highest receive sensitivity of the receive sensitivities. In addition, the first speaker 300 may provide, to the control module 200, the information on the identifying signal having the highest sensitivity.

In the third step (S1030), the control module 200 acquires a seat number of the first earphone, based on the identifying signal having the highest sensitivity. The control module 200 may determine the speaker to output the identifying signal having the highest sensitivity, and may specify the seat number matched to the speaker as the seat number of the first earphone.

Figure 11:
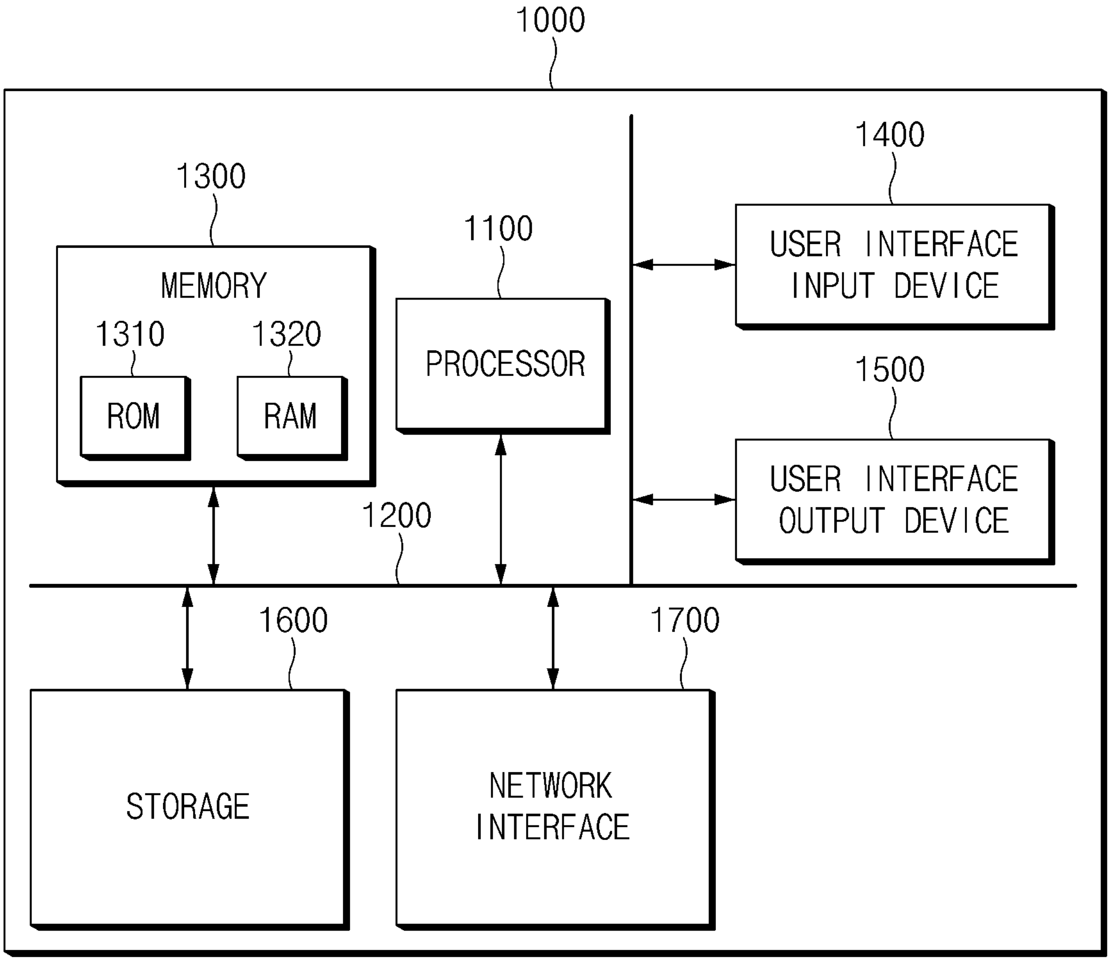
FIG. 11 is a view illustrating a computing system, according to one embodiment of the present disclosure.

FIG. 11 illustrates a computing system, according to an embodiment of the present disclosure.

Referring to FIG. 11, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

According to the present disclosure, since noise is canceled by controlling the earphone and the speaker inside the vehicle together, noise removing performance may be enhanced.

In addition, according to the present disclosure, the noise is canceled, based on noise simply present inside the vehicle and noise aurally perceived by the user. Accordingly, the user may actually feel that the noise canceling performance is enhanced.

In addition, according to the present disclosure, the noise is canceled, based on the signal obtained by synthesizing the multimedia sound and the compensating signal and noise aurally recognized by the user. Accordingly, the noise canceling performance may be enhanced.

Besides, a variety of effects directly or indirectly understood through the disclosure may be provided.

The above description is merely an example of the technical idea of the present disclosure, and various modifications and modifications may be made by one skilled in the art without departing from the essential characteristic of the present disclosure.

Therefore, the exemplary embodiments of the present disclosure are provided to explain the spirit and scope of the present disclosure, but not to limit them, so that the spirit and scope of the present disclosure is not limited by the embodiments. The scope of protection of the present disclosure should be construed by the attached claims, and all equivalents thereof should be construed as being included within the scope of the present disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for canceling noise in a vehicle, the method comprising:

receiving external noise information acquired through a first microphone of an earphone;

receiving internal noise information acquired through a second microphone of the earphone;

generating a compensating signal based on the noise information; and outputting the compensating signal through the earphone and an internal speaker of the vehicle; and wherein generating the compensating signal includes:

generating a first offset compensating signal based on amplitude information included in the internal noise information is equal to or greater than a preset threshold value; and synthesizing the first offset compensating signal with the compensating signal.

2. The method of claim 1, wherein generating the compensating signal includes:

generating a sound signal by synthesizing a multimedia sound with the compensating signal.

3. The method of claim 2, wherein receiving the noise information further includes:

receiving the sound signal included in the internal noise information.

4. The method of claim 3, wherein generating the compensating signal further includes:

generating a subtraction signal by subtracting the sound signal, which is included in the internal noise information, from the multimedia sound which is preset; and correcting the compensating signal, based on a strength of the subtraction signal being equal to or greater than a further preset threshold value.

5. The method of claim 4, wherein correcting the compensating signal includes:

generating a second offset compensating signal corresponding to the subtraction signal; and synthesizing the second offset compensating signal with the compensating signal.

6. A method for canceling noise in a vehicle, the method comprising: receiving first noise information from a first earphone worn by a first user inside the vehicle; and receiving second noise information from a second earphone worn by a second user inside the vehicle, generating a first compensating signal based on the first noise information; and generating a second compensating signal based on the second noise information; and outputting the first compensating signal through the first earphone; outputting the second compensating signal through the second earphone; and outputting the first compensating signal and the second compensating signal through an internal speaker of the vehicle.

7. The method of claim 6, wherein outputting the first compensating signal and the second compensating signal through the internal speaker of the vehicle includes:

outputting the first compensating signal through a first speaker group corresponding to the first earphone; and outputting the second compensating signal through a second speaker group corresponding to the second earphone.

8. An apparatus for canceling noise inside a vehicle, the apparatus comprising:

a speaker disposed inside the vehicle; and a control module configured to:

perform short-range communication with an earphone worn by a user being inside the vehicle, receive external noise information acquired through a first microphone of the earphone;

receive internal noise information acquired through a second microphone of the earphone;

generate a first offset compensating signal based on amplitude information included in the internal noise information is equal to or greater than a preset threshold value; and synthesize the first offset compensating signal with the compensating signal.

9. The apparatus of claim 8, wherein the control module is configured to generate a sound signal by synthesizing a multimedia sound with the compensating signal.

10. The apparatus of claim 9, wherein the control module is configured to acquire the sound signal from the internal noise information.

11. The apparatus of claim 10, wherein the control module is configured to:

generate a subtraction signal by subtracting the sound signal, which is included in the internal noise information, from the multimedia sound which is preset; and correct the compensating signal, when a strength of the subtraction signal is equal to or greater than a further preset threshold value.

12. The apparatus of claim 11, wherein the control module is configured to:

correct the compensating signal by generating a second offset compensating signal corresponding to the subtraction signal; and synthesizing the second offset compensating signal with the compensating signal.

13. An apparatus for canceling noise inside a vehicle, the apparatus comprising:

a speaker disposed inside the vehicle; and a control module configured to:

perform short-range communication with an earphone worn by a user being inside the vehicle;

generate a first compensating signal corresponding to first noise information acquired through a first earphone; and generate a second compensating signal corresponding to second noise information acquired through a second earphone; and output the first compensating signal and the second compensating signal through internal speaker of the vehicle.

14. The apparatus of claim 13, wherein the control module is configured to:

select a first speaker group of a plurality of speaker groups, which corresponds to the first earphone; and select a second speaker group of the plurality of speaker groups, which corresponds to the second earphone.

15. The apparatus of claim 13, wherein the control module is configured to generate a sound signal by synthesizing a multimedia sound with the first compensating signal.

16. The apparatus of claim 15, wherein the control module is configured to acquire the sound signal from the first noise information.

17. The apparatus of claim 16, wherein the control module is configured to:

generate a subtraction signal by subtracting the sound signal, which is included in the first noise information, from the multimedia sound which is preset; and correct the first compensating signal, when a strength of the subtraction signal is equal to or greater than a preset threshold value.

18. The method of claim 6, wherein generating the compensating signal includes:

generating a sound signal by synthesizing a multimedia sound with the first compensating signal.

19. The method of claim 18, wherein receiving the first noise information comprises receiving the sound signal included in the first noise information.

20. The method of claim 19, wherein generating the first compensating signal further includes:

generating a subtraction signal by subtracting the sound signal, which is included in the first noise information, from the multimedia sound which is preset; and correcting the first compensating signal, based on a strength of the subtraction signal being equal to or greater than a preset threshold value.

* * * * *